United States Patent [19]

Nagano

[11] Patent Number: 4,926,252
[45] Date of Patent: May 15, 1990

[54] COLOR IMAGE READING AND RECORDING APPARATUS AND ITS IMAGE RECORDING METHOD FOR RECORDING FULL COLOR IMAGES FROM STORED COLORED INFORMATION CREATED BY A SINGLE SCAN PROCESS

[75] Inventor: Fumikazu Nagano, Yamatokoriyama, Japan

[73] Assignee: Sharp Kabushiki Kaisha, Osaka, Japan

[21] Appl. No.: 110,336

[22] Filed: Oct. 20, 1987

[30] Foreign Application Priority Data

Oct. 20, 1986 [JP] Japan .................................. 61-249838

[51] Int. Cl.[5] .......................... H04N 1/46; H04N 1/21
[52] U.S. Cl. ......................................... 358/75; 358/78
[58] Field of Search .............................. 358/75, 78, 80

[56] References Cited

U.S. PATENT DOCUMENTS

| | | | |
|---|---|---|---|
| 4,485,413 | 11/1984 | Furuta et al. | 358/75 |
| 4,517,590 | 5/1985 | Nagashima et al. | 358/75 |
| 4,589,035 | 5/1986 | Yamanishi et al. | 358/75 |
| 4,631,577 | 12/1986 | Yamanishi | 358/75 |
| 4,642,680 | 2/1987 | Yamada | 358/78 |
| 4,658,303 | 4/1987 | Nagano | 358/75 |
| 4,668,978 | 5/1987 | Gokita | 358/75 |
| 4,816,902 | 3/1989 | Yamanishi | 358/75 |
| 4,845,549 | 7/1989 | Someya | 358/75 |

FOREIGN PATENT DOCUMENTS 2110045 6/1983 United Kingdom .
2132052 6/1984 United Kingdom .

*Primary Examiner*—Howard W. Britton
*Assistant Examiner*—Randall S. Svihla

[57] ABSTRACT

A color image reading and recording apparatus comprises three light source corresponding to blue, green and red colors disposed at one side opposite to the side of the original to be read. A CCD image sensor is used to obtain signals corresponding to the blue, green and red components of the original through the sequential lighting up and driving of the three light sources. The CCD image sensor receives light reflected from the original. A memory device is used to store color component signals corresponding to the blue, green and red components. A color converter then converts the color component signals into yellow, magenta, cyan and black. The apparatus further records the colors converted by the color converter onto a recording paper by controlling the recording of the yellow, magenta, cyan and black color images onto the same recording paper. Also, the apparatus records the single color images obtained by combination of specified color component signals stored in the memory device onto individual recording papers.

8 Claims, 7 Drawing Sheets

COLOR IMAGE READING AND RECORDING APPARATUS AND ITS IMAGE RECORDING METHOD FOR RECORDING FULL COLOR IMAGES FROM STORED COLORED INFORMATION CREATED BY A SINGLE SCAN PROCESS

BACKGROUND OF THE INVENTION

The present invention relates to color image reading and recording apparatus, and more particularly, to a color recording method using a color image reading and recording apparatus for optically scanning a color original, separating a same picture element into red, green and blue colors, and converting these colors to deliver outputs.

Generally in reading a color original, as the means of separating into red (R), green (G) and blue (B) colors, there are roughly two methods: the method of using various filters, that is, the method of passing the light reflected from the original into filters to pick up information of only specific wavelength regions so as to separate the original into colors, or the method of using plural light sources having different emission spectra as the light source to illuminate the original and separating the information into colors by sequentially driving them to light up.

In the conventional color copiers using the above methods, however, only a full color copy can be presented. Thus, when images for each individual color separation are needed in a printing shop or the like, the data of each individual color separation must be obtained from a black image, and then the image of each color must be determined by using a computer, which is complicated work.

SUMMARY OF THE INVENTION

It is hence a primary objective of this invention to present a color image reading and recording apparatus capable of recording full color copies and single color copies continuously.

In the light of the defects in the related art, it is another objective of this invention to present a recording method for use in a color image reading and recording apparatus such as color copier capable of continuously copying full color copies and single color copies.

Other objectives and further scope of applicability of the present invention will become apparent from the detailed description given below. It should be understood, however, that the detailed description of and specific examples, while indicating preferred embodiments of the invention, are given by way of illustration only, since various changes and modifications within the spirit and scope of the invention will become apparent to those skilled in the art from this detailed description.

This invention relates to a color image reading and recording apparatus comprising three light sources corresponding to blue, green and red colors disposed at one side opposing the original surface of the copy to be read; a CCD image sensor for sequentially illuminating and driving these three light sources, and leading the light reflected at the reading position of said original to obtain signals of blue component, green component and red component; a memory device for recording the signals of said blue component, green component and red component; and a color converter for converting said color components into yellow, magenta, cyan and black. The apparatus is capable of performing continuous full color recording of the recorded yellow, magenta, cyan and black color images on a same recording paper by converting the colors of the component signals of the memory device by means of the color converter and single color recording for the recorded single color images obtained by the combination of the color component signals from the memory device onto each recording paper.

This invention presents a full color copy by sequentially illuminating and driving three light sources, leading the light reflected at the reading position of the original to be read into the CCD image sensor, storing the green component and red component information into the memory device, converting the color components by the color converter, and recoding the yellow, magenta, cyan and black images sequentially onto one recording paper fed from a paper feed cassette. Afterwards, color components stored in the memory device are converted by the color converter, and recording papers are fed from the paper feed cassette for each color, and single color copies are presented sequentially.

Therefore, by scanning one scanning line of one original to be read three times, component signals of blue, green and red can be obtained, and as a result five types of copies, that is, a full color copy and single color copies (yellow, magenta, cyan and black) can be produced.

BRIEF DESCRIPTION OF THE DRAWINGS

The present invention will become more fully understood from the detailed description give hereinbelow and the accompanying drawings which are given by way of illustration only, and thus are not limitative of the present invention and wherein.

DETAILED DESCRIPTION OF THE INVENTION

Below is described the image reading and recording apparatus of the present invention. The image reading and recording apparatus of the present invention, using plural light sources having different emission spectra as the light source for illuminating the original, is designed to read an original document by color separation of the information on the original document by sequentially driving and lighting up the light sources. The present invention, however, is not limited to this method.

Figure 3:
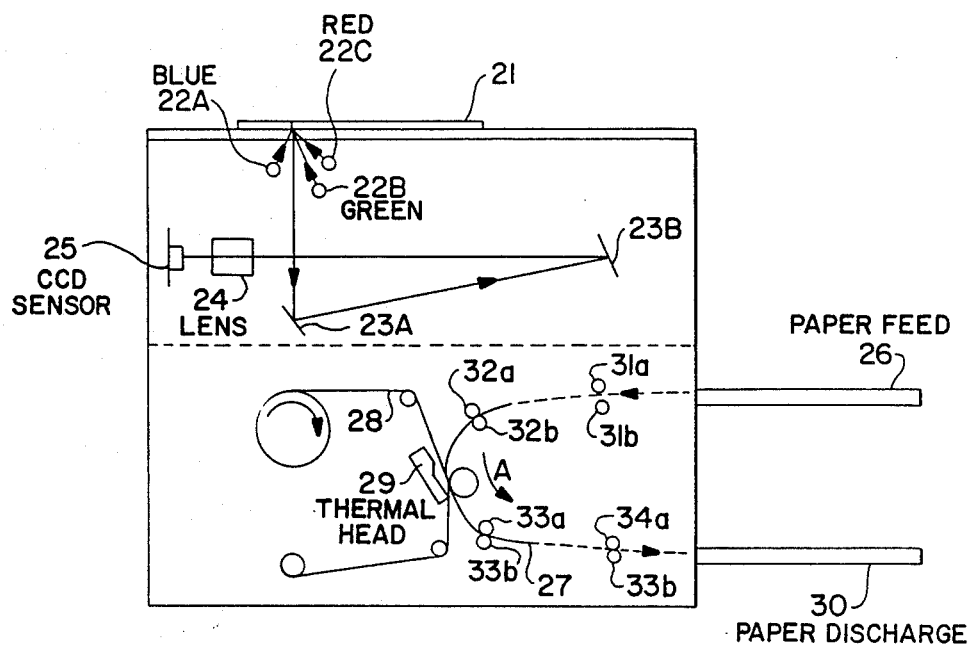
FIG. 3 is an explanatory drawing showing another embodiment of the color image reading and recording apparatus of the present invention, for example, a color copier.

Referring now to FIG. 3, the construction of the image reading and recording apparatus of the present invention is explained below. An original 21 is moved and placed in a specified position by a paper feed device (not shown), and is sequentially illuminated by plurality of light sources. The light sources for illuminating the original 21 are three light sources; a fluorescent light source 22A having a spectral radiation characteristic of a blue component; a fluorescent light source 22B having a spectral fluorescent radiation characteristic of a green component, and a light source 22C having a spectral radiation characteristic of a red component.

The light from the light sources reflected by the original 21 is further reflected by reflector mirrors 23A, 23B, and enters a reading lens 24. The light leaving the reading lens 24 is received by a CCD linear image sensor 25. In this case, when the light source 22A lights up, the reflected light which depends on the spectral radiation characteristic of the light source 22A enters the CCD linear image sensor 25. Therefore, from the CCD linear image sensor 25, the signal corresponding to the reflected light is sent to a signal processing part, and a blue component signal SB is obtained after a processing step.

Consequently, the light source 22A goes out, and the light source 22B lights up. Similarly, a green component signal SG is obtained. Next, the light source 22B goes out and the light source 22C lights up, and a red component signal SR is obtained in the same manner. Then the original 21 is moved in the direction of arrow A by a specified distance, and the same cycle is repeated to read the original sequentially.

Color component signals obtained by one illumination of each light source 22A, 22B, 22C are stored in a memory (not show). Here, the original to be read is separated into a plurality of scanning lines, that is, into specified width, and each scanning line is illuminated once by each light source 22A, 22B, 22C, and color component signals of blue, green and red are obtained. Thus, by obtaining color component signals from each scanning line, a page of original information is read out.

After storing the color component signals of one page of information in the memory and before making a full color recording by using these color component signals, color component signals (SB, SG, SR) are converted by a color converter to obtain yellow, magenta, cyan and black images, which are sequentially recorded on a sheet of recording paper 27 fed from a paper feed cassette 26 through paper feed rollers 31a, 31b, 32a, 32b, by a thermal head 29 through ink ribbons 28 composed of yellow, magenta, cyan and black colors, and the paper is discharged into a discharge tray 30 through paper discharge rollers 33a, 33b, 34a, 34b.

In this way, a full color image is recorded on a recording paper.

The color image reading and recording apparatus of this invention is described in further details below.

Figure 1:
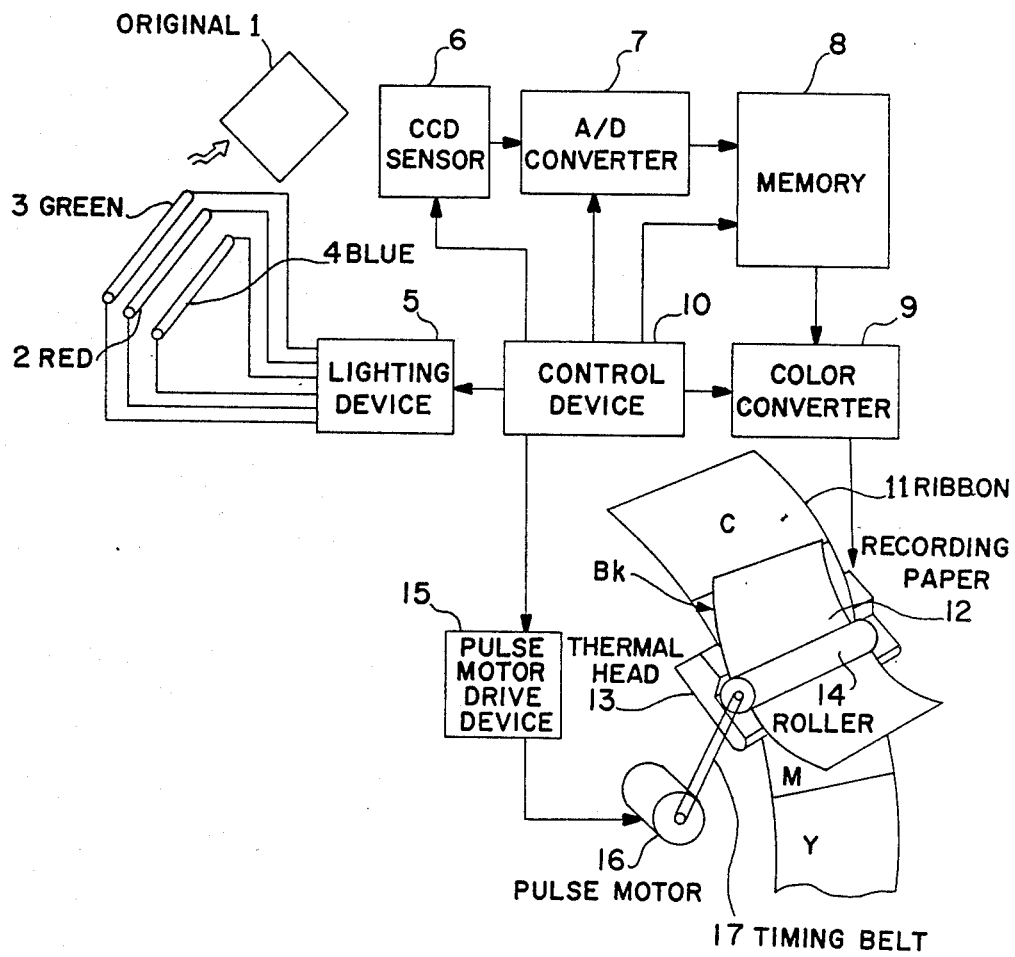
FIG. 1 is a block diagram showing a color image reading and recording apparatus according to one embodiment of the present invention.

FIG. 1 is a block diagram showing the construction of a color image reading and recording apparatus in one of the embodiments of the present invention, and FIG. 2a, 2b, 2c and 2d are operation flow charts of the color image reading and recording apparatus. In the drawing, numeral 1 is an original to be read; 2, 3, and 4 are fluorescent lamps having the colors, red, green and blue; 5 is a lighting device for sequentially lighting up and driving light sources 2, 3, and 4; 6 is a CCD image sensor for receiving the reflected light of light sources 2, 3, and 4 from the original 1; 7 is an A/D converter; 8 is a memory device for storing the color component information of light sources 2, 3, and 4; and 9 is a color converter for converting from the color component information stored in the memory device 8 into yellow, magenta, cyan and black colors, in which the yellow color is obtained from the color component information of red and green, the magenta color from that of red and blue, the cyan color from that of green and blue, and the black from that of red, green and blue. Furthermore, numeral 10 is a control device; 11 is an ink ribbon having yellow, magenta, cyan, and black colors disposed in each area; 12 is a recording paper; 13 is a thermal head for recording an image on the recording paper 12 by way of the ink ribbon 11 according to the information from the color converter 9; 14 is a platen roller; 15 is a pulse motor drive device, 16 is a pulse motor; and 17 is a timing belt.

Figure 2A:
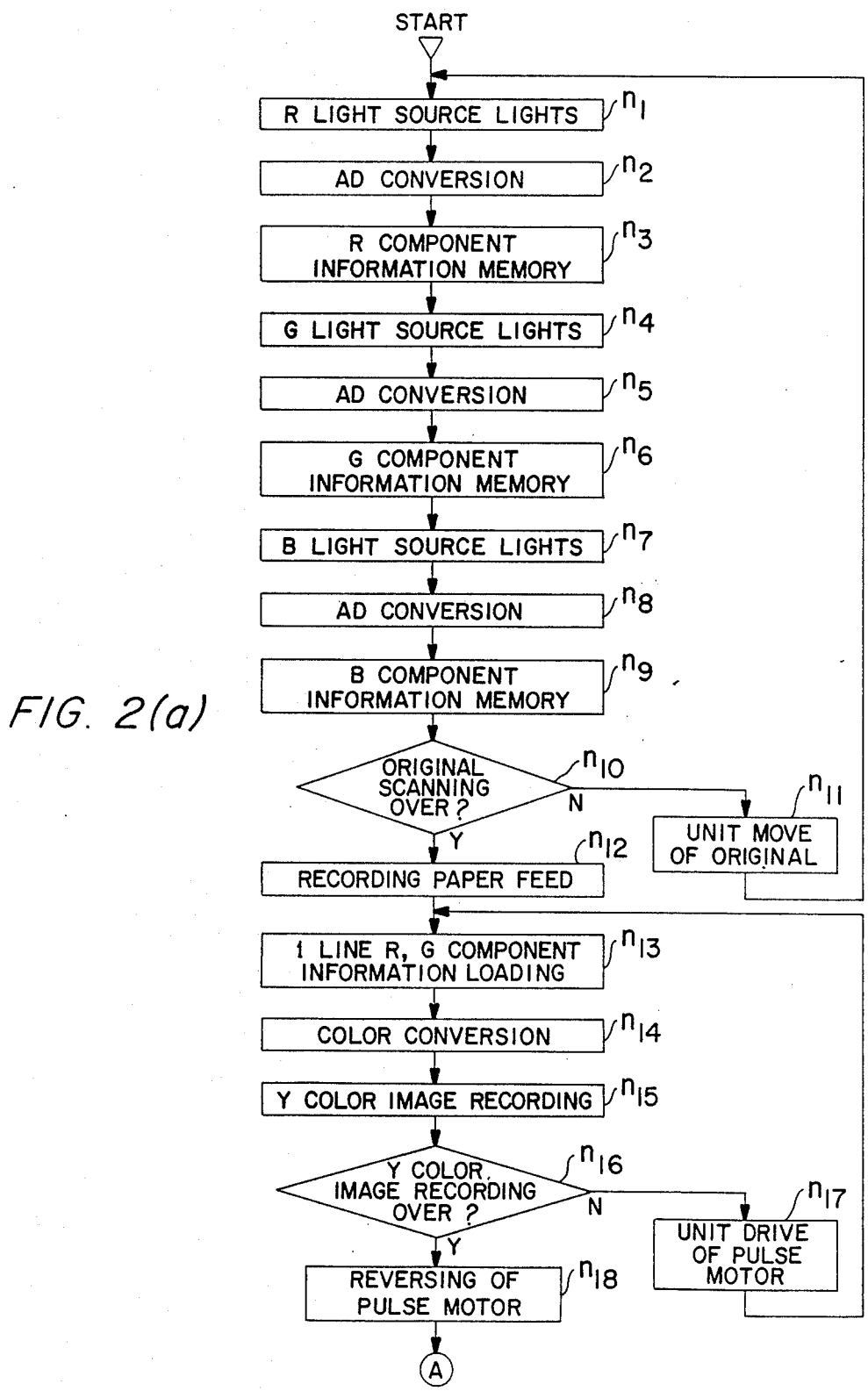
FIG. 2a, 2b, 2c, 2d are flow charts showing the operation of the present invention.
Figure 2B:
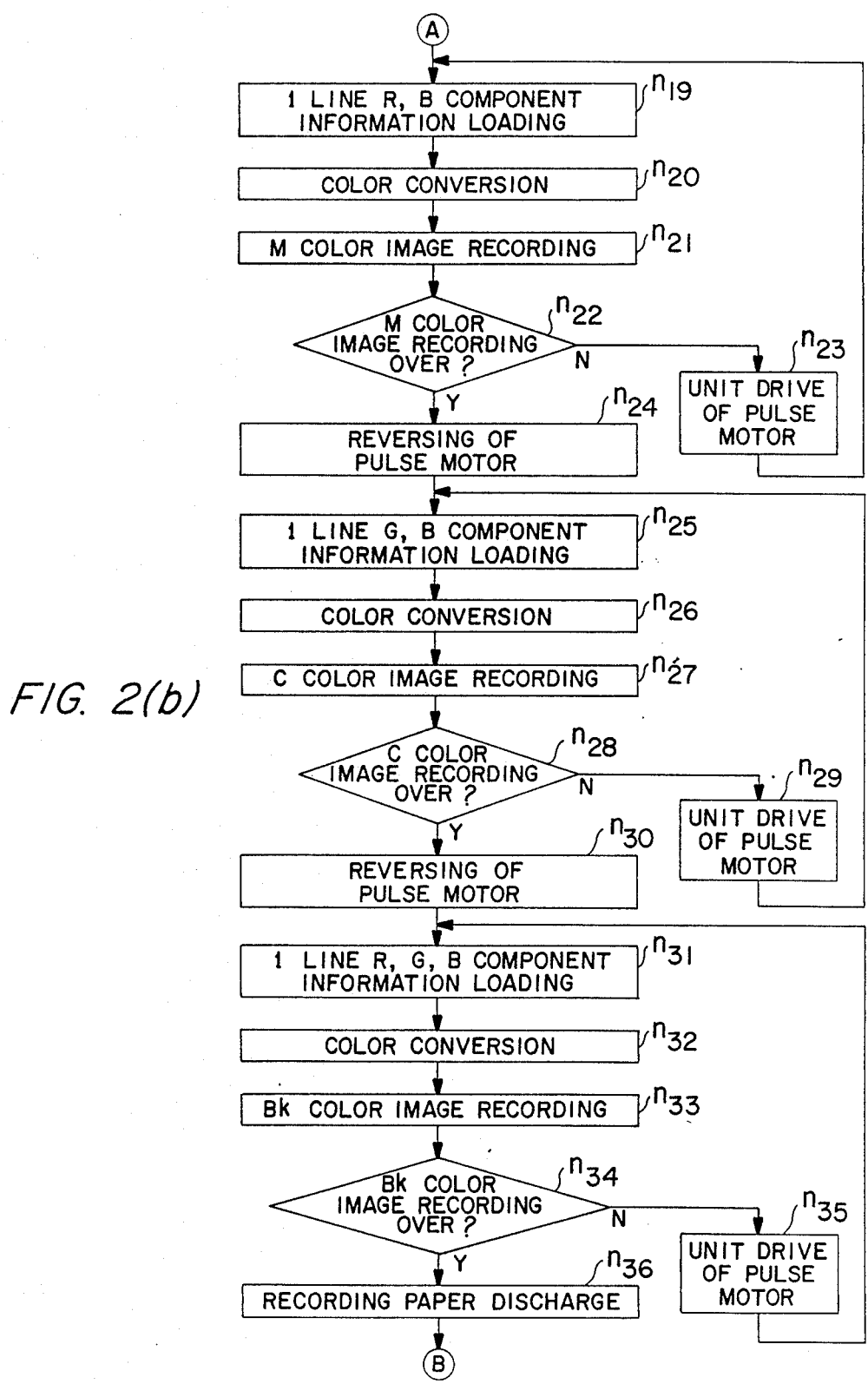
Figure 2C:
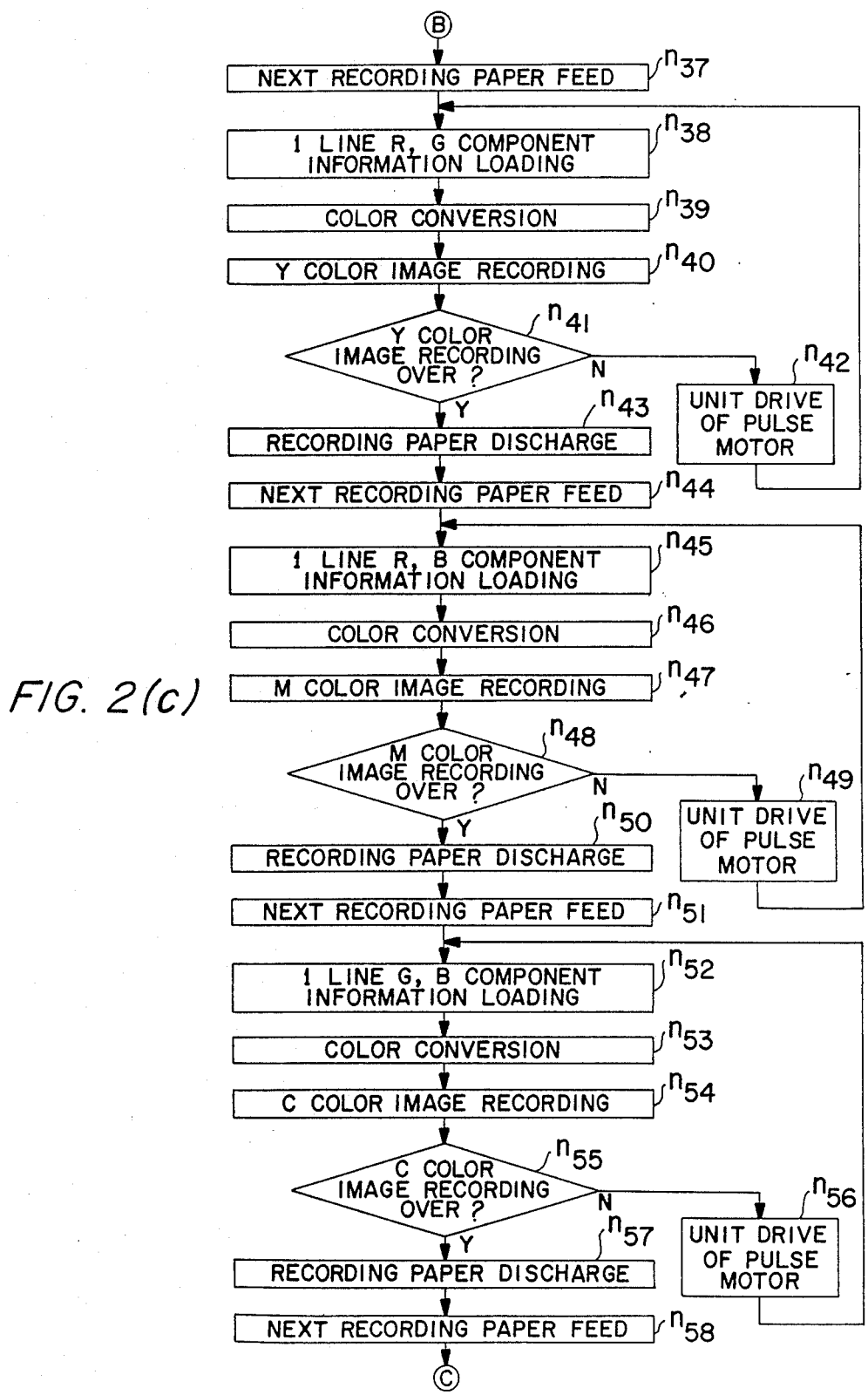
Figure 2D:
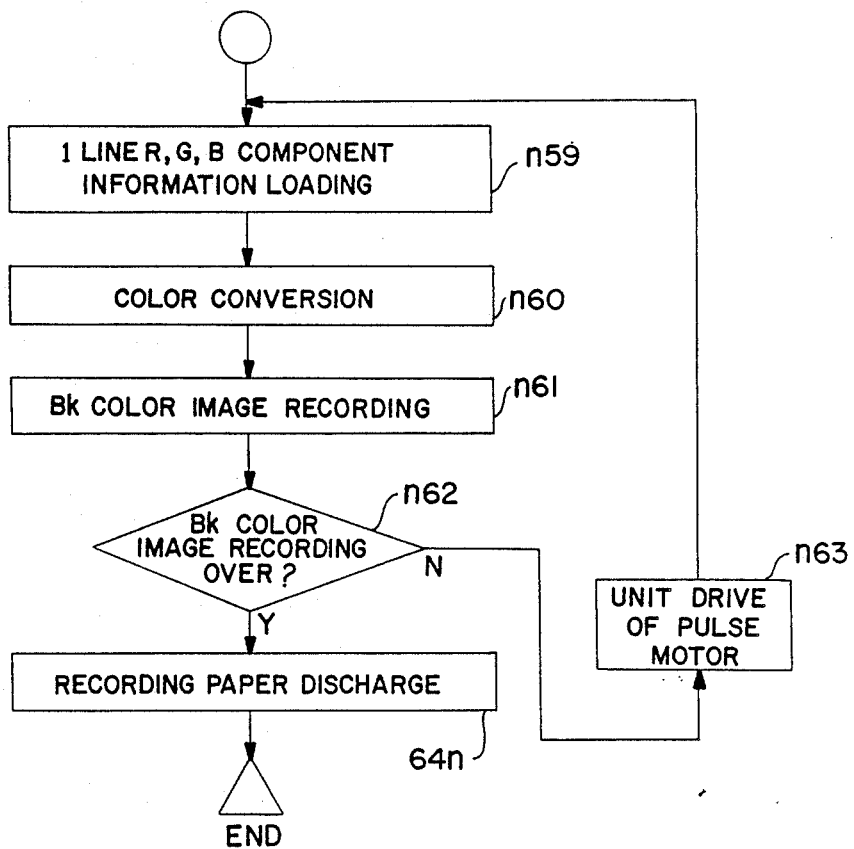

As shown in FIGS. 2(c)–2(a), color image reading and recording apparatus of the present invention, for example, the color copier lights up the red light source 2 by the lighting device 5 (step n1), leads the light reflected at the reading position of the original 1 onto the CCD image sensor 6 which subjects the light to A/D conversion by the A/D converter (step n2), and stores it as the red component information in the memory device 8 (step n3). Next, lighting up the green light source 3 (step n4), the light entering the CCD image sensor 6 is A/D converted (step n5) with the digital signal being stored in the memory device 8 as the green component information (step n6). Similarly, the blue component information is stored in the memory device 8 (step n7 to step n9). Thus, the color component information of one scanning line is read. Then, judging if the original scanning is not fully (step n10), the original is moved by unit (step n11). Thus, the same scanning is repeated for entire portion of one page of original. When original scanning is over, the recording paper 12 is fed (step n12). Consequently, the red and green component information for one scanning line stored in the memory device 8 is loaded (step n13). This information is converted into a yellow color by the color converter 9 (step n14), and a yellow image is recorded on the recording paper 12 (step n15). Thus, the yellow images of all scanning lines (for the portion of one page of original) are recorded. Judging if recording of yellow images is over or not (step n16), if not, the pulse motor 16 is driven by unit (step n17). This unit drive is used to advance the recording paper 12 by the portion of one scanning line. When the yellow image recording is over, the pulse motor 16 is driven in the reversed direction (step n18). This reverse driving of the pulse motor 16 is intended to return the recording paper 12 to the recording start position. In the similar operations, magenta, cyan and black images are sequentially recorded (step n19 to step n35), and the recording paper 12 is discharged (step n36). Steps n19 to n24 of magenta image recording correspond to steps n13 to n18 of yellow image recording, respectively. Steps n25 to n30 of cyan image recording correspond to steps n13 to n18 of yellow image recording, respectively. Steps n31 to n35 of black image recording correspond to steps n13 to n18 of yellow image recording, respectively.

As a result, a full color copy can be presented. Then, in response to the termination of the full color image recording, a recording paper for single color image recording is fed (step n37), and the red and green color component information is loaded in each scanning line (step n38), and is converted into a yellow color (step n39), and a yellow image is recorded on the recording paper (step n40). Judging if recording of yellow image is over or not (step n41), if not, the pulse motor 16 is driven in unit to advance the recording paper 12a by one scanning line (step n42). When the image recording is over, the recording paper is discharged (step n43), and a next recording paper for recording magenta image is fed (step n44). The same operation as in steps n37 to n43 of yellow image recording is carried out for magenta image (steps n44 to n50), cyan image (steps n51 to n57), and black image (steps n58 to n64).

In this way, the operation is repeated until the black image recording is over (steps n45 to n64), and when the recording paper on which the images are recorded is discharged, the process is complete. As a result, four single color copies can be presented.

Therefore, from one reading of an original, one full color copy and four single color copies, or a total of five copies can be produced.

Figure 4:
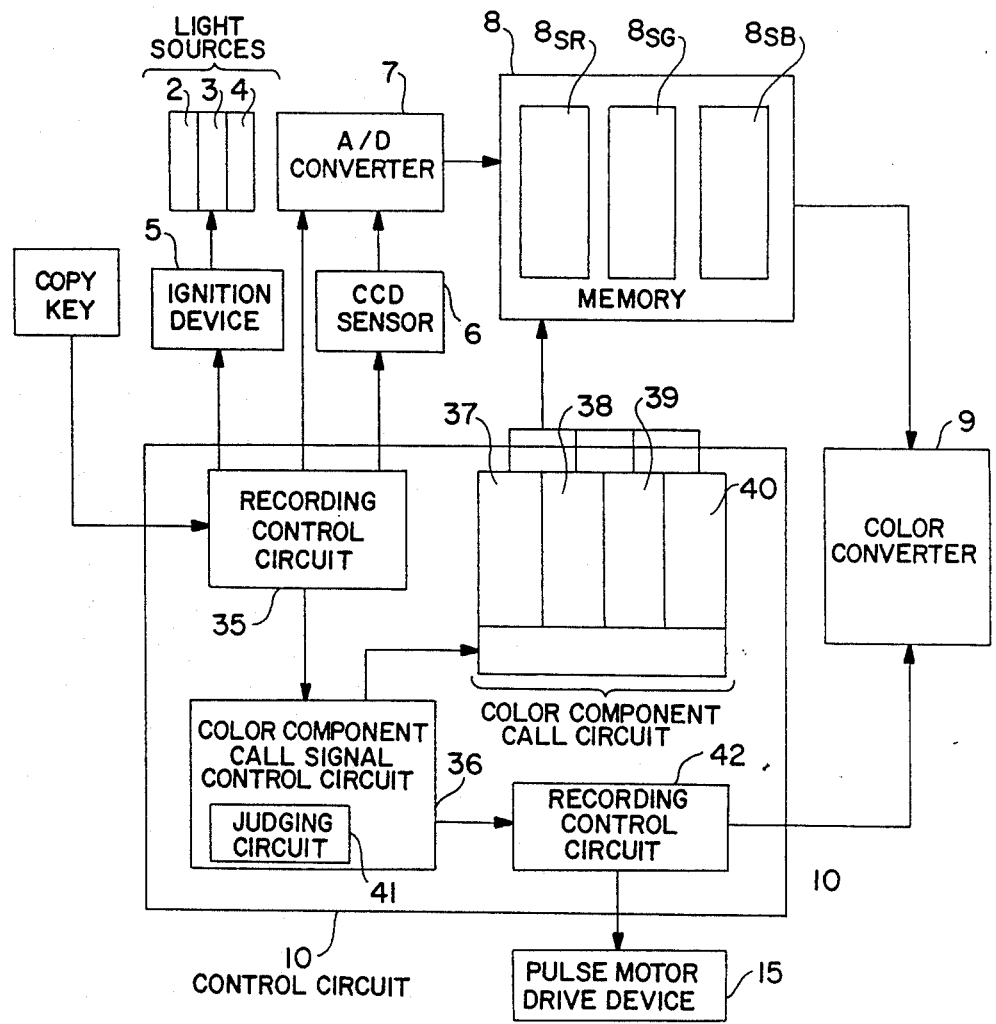
FIG. 4 is a block diagram explaining the control unit of the color image reading and recording apparatus shown in FIG. 1.

Turning to FIG. 4, the drive unit of the color image reading and recording apparatus of this invention is describe below.

In response to the pressing of the copy key on the operation panel (not shown) of the color image reading and recording apparatus, an image recording control circuit 35 in the control circuit 10 drives the ignition device 5 and lights up the light sources 2, 3, 4 for each scanning line. Then the reflected light from the original enters the CCD image sensor 6. This CCD image sensor 6 obtains an analog signal depending upon the inputted reflected light. This signal is converted into a digital signal by A/D converter 7, and the digital signal (that is, each color component signal) is stored in the memory device 8 according to each scanning line. As the original to be read is scanned in each scanning line by three light sources, the information is separated into the blue component signal SB, green component signal SG, and red component signal SR. These signals are stored in memories $8_{SB}$, $8_{SG}$ and $8_{SR}$ one for each color component. The information is stored according to the color component information in each scanning line. By scanning all lines and storing the obtained color component information in each memory, one page of the original is read.

When the image recording control circuit 35 judges that all lines have been scanned and that the color component signals of one page of the original have been stored, it issues a color component call signal to a color component call signal control circuit 36. This color component call signal control circuit 36 first calls the red and green color component signals in each scanning signal line from the memories $8_{SR}$ and $8_{SG}$ through the red and green color component call signal circuit 37. These color component signals are converted into a corresponding yellow color by the color converter 9, which is then recorded on the recording paper in response to the recording control circuit 42. This operation is done on all scanning lines, and when the recording of the final scanning line is judged to be finished, the color component call signal control circuit 36 calls the red and blue component signals for each scanning line from the memories $8_{SR}$ and $8_{SB}$ through the red and blue color component call signal circuit 38. These color component signals are converted into a corresponding magenta color in the color converter 9, which is then recorded on the same recording paper in response to the recording control circuit 42. In succession to this operation, the color component call control circuit 36 controls the green and blue color component call circuit 39 to record cyan color on the same recording paper. The red, green and blue color component are called by color component call circuit 40, and black color is recorded on the same recording paper.

Thus, the color component call signal control circuit 36 continuously controls four color component call circuits 37 to 40, and presents a full color recording. When the end of this full color recording is detected by a judging circuit 41, that is, when the four color component call circuits 37 to 40 are controlled continuously to reproduce a full color copy composed of yellow, magenta, cyan and black is reproduced on a same recording paper, the color component call control circuit 36 independently controls the color component call circuits 37 to 40. Yellow, magenta, cyan and black colors are then individually recorded on separate recording papers to effect single color recording. Thus, in this invention, full color recording and single color recording are accomplished continuously.

This invention may be used in a color copier.

As described herein, this invention relates to a color image reading and recording apparatus which comprises three light sources corresponding to blue, green and red colors disposed at one side opposite to the side of the original to be read; a CCD image sensor for obtaining signals of the blue component, green component and red component by sequentially lighting up and driving these three light sources and leading the light reflected from the reading position of the original to the image sensor; a memory device for storing the signals of the blue component, green component and red component; and a color converter for converting the color components into yellow, magenta, cyan and black, in which only by a single operation for presenting a full color copy and single color copies will be automatically presented after the full color copy is presented.

While only certain embodiments of the present invention have been described, it will be apparent to those skilled in the art that various changes and modifications may be made therein without departing from the spirit and scope of the present invention as claimed.

What is claimed is:

1. A color image reading and recording apparatus, comprising:
    three light sources corresponding to blue, green, and red colors disposed at one side opposite to a side of an original to be read;
    CCD image sensor means for obtaining signals, each signal representing a blue component, green component or red component, said CCD image sensor means sequentially lighting up and driving said three light sources and receiving light reflected from said original only once during a reading and recording operation;
    memory means for storing said signals representing said blue component, green component and red component;
    color converter means for converting the stored color component signals into yellow, magenta, cyan and black color signals;
    means for recording the color signals converted by said color converter means onto a recording paper;
    first control means for controlling the recording means to record yellow, magenta, cyan and black color images onto a recording paper in response to the color signals; and
    second control means for controlling the recording means to record single individual color images onto individual recording papers in response to the individual color signals.

2. A color recording method for a color image reading and recording apparatus, comprising the steps of:
    (a) selecting light sources corresponding to blue, green, and red colors;

(b) positioning said light sources opposite an original to be read;
(c) sequentially lighting said light sources;
(d) receiving light reflected from said original;
(e) obtaining signals corresponding to blue, green, and red components of the light received in said step (d);
(f) storing said signals obtained in said step (e);
(g) converting said stored signals of said step (f) into color signals corresponding to yellow, magenta, cyan, and black;
(h) recording said color signals of said step (g) onto a same recording paper without repeating said steps (a) through (f); and
(i) recording each individual color signal of said step (g) onto a separate individual recording paper without repeating said steps (a) through (f), thereby producing five recorded copies of said original.

3. The method as claimed in claim 2, wherein said step (h) proceeds said step (i).

4. An apparatus for performing color image reading and recording processes comprising:
light means, for providing at least three colors of light to an original image being scanned; said light means operating only once during a single reading and recording process;
digitalizing means, responsive to said light means, for converting light reflected from said original image into color component signals representing color components of the colors provided by said light means;
storing means, operatively connected to said digitalizing means, for storing said color component signals;
converting means, operatively connected to said storing means, for converting said color component signals into color signals, each color signal being representative of a combination of at least two color component signals; and
printing means, operatively connected to said converting means, for recording a full color image onto a single recording paper; said color image representing a combination of all of said color signals produced by said converting means;
said printing means recording onto separate individual recording papers respective individual color signals such that a single color image representing only said respective individual color signal is recorded onto each separate individual recording paper.

5. The apparatus as claimed in claim 4, wherein said light means includes:
a plurality of light sources, said light sources producing blue, green, and red colors individually; and
driving means, operatively connected to said light sources, for sequentially driving said light sources such that said colors are produced separately;
said light sources being positioned opposite the original image being scanned.

6. The apparatus as claimed in claim 4, wherein said digitalizing means includes:
sensing means, for receiving said light reflected from said original and for producing signals representative of the colors of the received light; and
digital converting means, operatively connected to said sensing means, for converting said signals into said color component signals.

7. The apparatus as claimed in claim 4, wherein said storing means includes:
a compartmental memory having a plurality of compartments, each compartment storing an individual set of color component data corresponding to a distinct color component signal received from said digitalizing means.

8. The apparatus as claimed in claim 4, wherein said printing means includes:
pulse motor drive means, operatively connected to said converting means, for determining if the recording of a recording paper is complete and for producing an advance signal if the recording is incomplete;
pulse motor means, responsive to said advance signal, for advancing said recording paper a unit length;
inking means, for providing color ink corresponding to said color signals from said converting means;
thermal means, operatively connected to said converting means and said inking means, for applying said color ink to said recording paper in response to the color signals.

* * * * *